United States Patent [19]

Schmidt et al.

[11] 4,284,229
[45] Aug. 18, 1981

[54] RECLOSABLE CROSS-BOTTOM SACK

[75] Inventors: Horst Schmidt, Kattenvenne; Hans Struck, Tecklenburg, both of Fed. Rep. of Germany

[73] Assignee: Windmöller & Hölscher, Lengerich, Fed. Rep. of Germany

[21] Appl. No.: 72,998

[22] Filed: Sep. 6, 1979

[30] Foreign Application Priority Data

Sep. 19, 1978 [DE] Fed. Rep. of Germany ....... 2840732

[51] Int. Cl.³ .............................................. B65D 33/38
[52] U.S. Cl. ..................................... 229/57; 141/317; 229/17 B
[58] Field of Search ....................... 229/62, 57, 58, 59, 229/17 B; 150/1; 141/316, 317, 337

[56] References Cited

U.S. PATENT DOCUMENTS

| 296,871 | 4/1884 | Onderdonk | 229/59 |
| 391,804 | 10/1888 | Leinbach | 229/59 |
| 401,687 | 4/1889 | Claussen | 229/57 |
| 2,100,888 | 11/1937 | Vine | 141/337 |
| 2,909,238 | 10/1959 | Lofgren | 229/62 |
| 3,374,929 | 3/1968 | Silfverskiöld | 150/1 |
| 3,789,897 | 2/1974 | Saito | 150/1 |

Primary Examiner—Stephen P. Garbe
Attorney, Agent, or Firm—Fleit & Jacobson

[57] ABSTRACT

A reclosable cross-bottom sack is provided over the cross-bottom with a cover sheet having an incision and lines of weakness. A flattened tubular plastics emptying nipple for the sack is folded and cut at one end to define flaps, extends through the incision and is secured to the sheet by its flaps to lie between the cross-bottom and the cover sheet.

8 Claims, 4 Drawing Figures

RECLOSABLE CROSS-BOTTOM SACK

The invention relates to a reclosable cross-bottom sack comprising a tube section of which the pulled-open base square is closed to form a cross-bottom by folding inwardly and adhering the side flaps and by sticking on a base cover sheet.

Particularly in the case of sacks of large capacity, of which the contents are not to be withdrawn all at once, the problem arises of closing them again after part of the contents have been removed. Since the filling end of the large sacks is usually employed for suspending them during transport and emptying, this end is not available for the purpose of opening and withdrawing the contents. Such large sacks having their filling aperture suspended for example from a crane hook are usually opened by cutting open the base as is described in Applicants' prior Patent Application P 28 25 644.2. Such cutting open of the bases does not, however, permit withdrawal of part quantities, which is often required by reason of the large filling capacity of the sacks.

Large sacks or container sacks are known in which the supporting outer sack has an inner sack of plastics film inserted in it that is provided with a nipple-like extension which is closed at its end by a clip, passed through an aperture or slot in the base of the outer sack and releasably secured to the base of the outer sack in a folded or rolled condition. To withdraw part quantities, the nipple-like extension can be released from the base of the large sack, opened by cutting off the clip and reclosed by tying, binding together or in some other way. The disadvantage of the known large sack resides in the fact that it must be provided with an inner sack corresponding to its size, additional measures being necessary so that its closed nipple-like extension disposed in an aperture of the base is able to withstand the pressure of the base.

It is the problem of the present invention to provide an easily made reclosable cross-bottom sack which uses the least possible material.

According to the invention, this problem is solved in a cross-bottom sack of the aforementioned kind in that a flattened tube section of plastics material or plastics tape fabric that has side folds, is provided with incisions along the outer folded edges and is pulled open at right-angles at one end is secured to the central region of the base cover sheet by the flaps formed by the incisions, that the base cover sheet, which is not adhered to the cross-bottom in the region of the pulled-open rectangle of the side-folded tube section, is provided with incisions or lines of perforations enabling it to be opened over a cross-section corresponding to the rectangle, and that the end of the side-folded tube section is closed by a transverse weld seam. The sack according to the invention which can for example be suspended from the hook of a crane can be opened in that the side-folded tube section forming an outlet nipple is severed above the transverse weld seam, the lines of perforations, if present in the base cover sheet, are torn open and any underlying layers of the base are cut open. If the sack is not to be emptied completely, the side-folded tube section expanded to form an outlet nipple can, after part of the contents have been removed, be reclosed by pressing together, it even being possible to obtain a watertight seal in that the outlet end of the side-folded tube section is turned over and laterally secured to the sack.

The outlet nipple according to the invention can also be employed as a filling nipple if apertures are provided which extend through the base cover sheet as well as the base and if, after filling, the side-folded tube section is closed and secured to the base cover sheet in a manner so as to take up the base pressure, it being possible to provide a pocket for receiving it.

Desirably, the seams connecting the side-folded tube section to the base cover sheet extend parallel to the outer edges of the flaps, at least two of the parallel seams extending beyond their incisions and engaging the side edges of the adjoining flaps at least up to the intersecting seams. By reason of the fact that at least two parallel seams extend beyond the incisions into the pulled-open side-folded tube and also engage the side edges of the flaps disposed therebetween, no gussets with open apices are formed at the corners of the pulled-open rectangle.

The base cover sheet may be provided with an incision which is in registry with the flattened side-folded tube at right-angles thereto and is bounded at its ends by perpendicular lines of perforations extending parallel to the inner edges of the rectangle. To open the base cover sheet, it is merely necessary to reach into the side-folded tube through the central slit and to form flaps which open the base cover sheet by tearing open the lines of perforations.

According to a preferred embodiment, an internal lock connected at least to the confronting inner edges of the corner folds is inserted in the pulled-open base square, the confronting edges of the turned-over side flaps are spaced from each other and the central incision of the cover sheet extends parallel to the edges of the side flaps. To open the base, it is then merely necessary to tear out the opening flaps from the base cover sheet and to pierce the thereby exposed internal lock.

One example of the invention will now be described in more detail with reference to the drawing, wherein.

Depending on the material of the walls of the large sack, the base cover sheet 1 is of plastics material or a fabric of plastics tapes which is laminated or adhered to a film of plastics material. The base cover sheet is provided with a central slit 2 formed by an incision which is bounded at its ends by perpendicular lines of perforations 3.

Figure 1A:
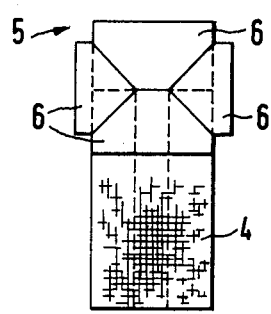
FIG. 1a shows a flattened side-folded tube with a pulled-open end folded into the plane of the tube.

The flattened side-folded tube 4 shown in FIG. 1a is provided at its upper end with incisions along the outer folded edges of the side folds and was subsequently pulled open to result in the illustrated rectangular opening area which is adjoined by the lateral flaps 6 having a height corresponding to the depth of the incisions.

Figure 1:
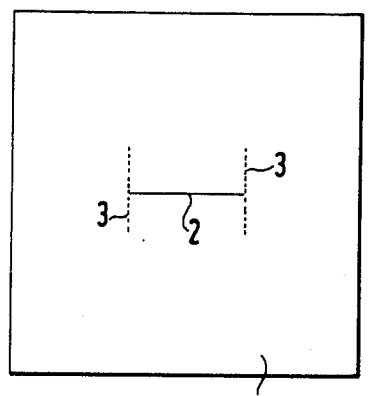
FIG. 1 illustrates a base cover sheet with a central slit and perforations bounding same.
Figure 2:
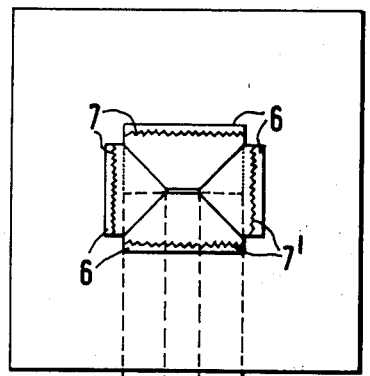
FIG. 2 shows the base cover sheet of FIG. 1 with the side-folded tube of FIG. 1a welded onto it.

The prepared side-folded tube section shown in FIG. 1a is connected to the illustrated FIG. 2 base cover sheet by pushing the end of the side-folded tube section through the slit 2 until the pulled-open portion 5 of the side-folded tube section lies flat on the inside of the base cover sheet 1. The flaps 6 formed by the incisions are then connected to the base cover sheet 1 by means of weld seams 7 in the manner shown in FIG. 2.

The gussets formed by the incisions in the side-folded tube section can be sealingly welded to the base cover sheet 1 in that the weld seams are offset inwardly to such an extent that they also engage the side edges of the adjoining side flaps 6, as is indicated by the weld seam 7'.

Figure 3:
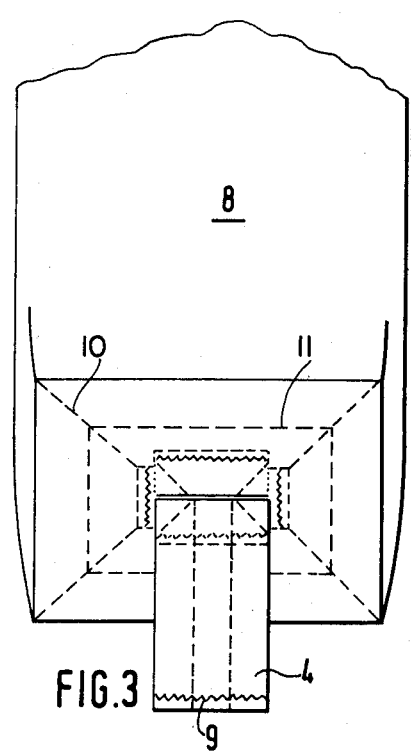
FIG. 3 shows the base cover sheet of FIG. 2 with the welded-on-side-folded tube in a condition when adhered to the cross-bottom of a large sack.

The base cover sheet 1 prepared in the manner shown in FIG. 2 is then adhered onto the cross-bottom, portions of which designated 10 are illustrated in FIG. 3, of the large sack 8 in the manner shown in FIG. 3, the side-folded tube section projecting from the slit 2 being closed by a weld seam 9 and forming an outlet nipple.

If, now, the large sack 8 is to be emptied partially or completely, the depending side-folded tube section 4 is first severed above the weld seam 9. Subsequently, after pushing the lines of perforations 3 open and after making a cut in any internal lock, which is designated 11 in FIG. 3, that may be present, an aperture is formed through which the material can run out. The emptying process can be interrupted at any time by pressing together the side-folded tube section 4 which forms an outlet nipple.

What is claimed is:

1. A reclosable cross-bottom sack comprising:
   a tube section having a pulled-open base square closed to form a cross-bottom by folding inwardly and adhering side flaps of the base square;
   a base cover sheet applied and adhered to portions of the folded side flaps; and
   a flattened tube section having side folds and incisions along outer folded edges at one end thereof that define side flaps, the base cover sheet having an incision formed in a central region thereof with the flattened tube section extending through the incision in the base cover sheet and the side flaps of the flattened tube section being pulled away from each other and secured to the base cover sheet prior to the base cover sheet being applied to the fold side flaps of the tube section, a region of the base cover sheet including the incision and corresponding to the size of the flattened tube section when expanded not being adhered to the cross-bottom.

2. A reclosable cross-bottom sack according to claim 1, wherein said base cover sheet includes lines of perforations extending perpendicular to the incision so that the central region of the base cover sheet is openable to form a cross-section corresponding to the size of the flattened tube section when expanded.

3. A reclosable cross-bottom sack according to claim 1 or 2, wherein the end of the flattened tube section opposite the end secured to the base cover sheet is closed by a transverse weld seam.

4. A reclosable cross-bottom sack according to claim 1 or 2, wherein the flattened tube section is formed of plastics material.

5. A reclosable cross-bottom sack according to claim 1 or 2, wherein the flattened tube section is formed of plastics tape fabric.

6. A cross-bottom sack according to claim 1, characterized in that the incision in the base cover sheet is in registry with the flattened tube section at right-angles thereto and is bounded at its ends by perpendicular lines of perforations extending parallel to inner edges of a rectangle defined by pulled apart side flaps of the flattened tube section.

7. A cross-bottom sack according to claim 1, characterized in that the folded side flaps are portions of corner folds formed by pulling open the tube section and wherein an internal lock is connected at least to confronting inner edges of said corner folds, confronting edges of the folded side flaps being spaced from each other, and the incision in the base cover sheet extending parallel to edges of the folded side flaps.

8. A cross-bottom sack according to claim 1 wherein the flattened tube section has opposed pairs of side flaps secured to the base cover sheet by pairs of parallel weld seams, one of the pairs of weld seams being spaced outside of the outer folded edges of the tube section.

* * * * *